(12) United States Patent
Starr

(10) Patent No.: US 7,665,012 B2
(45) Date of Patent: Feb. 16, 2010

(54) IMPULSE NOISE MITIGATION

(75) Inventor: Thomas Starr, Barrington, IL (US)

(73) Assignee: AT&T Intellectual Property I, LP, Reno, NV (US)

( * ) Notice: Subject to any disclaimer, the term of this patent is extended or adjusted under 35 U.S.C. 154(b) by 335 days.

(21) Appl. No.: 11/267,591

(22) Filed: Nov. 4, 2005

(65) Prior Publication Data

US 2007/0124624 A1 May 31, 2007

(51) Int. Cl.
*G06F 11/00* (2006.01)
*H03M 13/00* (2006.01)

(52) U.S. Cl. .................. 714/817; 714/774; 375/345

(58) Field of Classification Search .......... 714/774, 714/817; 375/345
See application file for complete search history.

(56) References Cited

U.S. PATENT DOCUMENTS

| | | | | | |
|---|---|---|---|---|---|
| 4,068,174 | A | * | 1/1978 | Svelund | 375/323 |
| 5,311,087 | A | * | 5/1994 | Suganuma | 327/94 |
| 5,377,276 | A | * | 12/1994 | Terai et al. | 381/71.11 |
| 5,495,229 | A | * | 2/1996 | Balch et al. | 340/572.4 |
| 5,499,189 | A | * | 3/1996 | Seitz | 700/286 |
| 5,657,244 | A | * | 8/1997 | Seitz | 700/292 |
| 5,703,904 | A | * | 12/1997 | Langberg | 375/232 |
| 5,943,637 | A | * | 8/1999 | Okumura et al. | 702/111 |
| 6,920,194 | B2 | | 7/2005 | Stopler et al. | |
| 7,274,794 | B1 | * | 9/2007 | Rasmussen | 381/92 |
| 2006/0078044 | A1 | * | 4/2006 | Norrell et al. | 375/222 |

OTHER PUBLICATIONS

International Search Report for International Application No. PCT/US06/42399, mailed on Dec. 15, 2008.
Written Opinion of the International Searching Authority for PCT/US06/42399, mailed on Dec. 15, 2008.

* cited by examiner

*Primary Examiner*—M. Mujtaba K Chaudry
(74) *Attorney, Agent, or Firm*—Toler Law Group

(57) ABSTRACT

In a signal transmission medium such as an ac power line, impulse noise in the line may be dealt with by detecting impulse noise in the transmission medium, determining whether the impulse noise is periodic or complex, and, at least approximately, correlating the time at which periodic impulse noise occurs in the transmission medium to the phase of the ac power line frequency. One or more noise mitigation techniques may be applied with respect to the impulse noise. Methods also include predicting at least the approximate time of the next periodic noise impulse, and at least its approximate occurrence in the phase of the ac power line frequency. Methods also address impulse noise in complex impulse conditions.

37 Claims, 5 Drawing Sheets

IMPULSE NOISE MITIGATION

FIELD OF THE DISCLOSURE

The present disclosure relates to telecommunications, and in particular to methods, systems, and devices to mitigate impulse noise in telecommunications transmission media.

BACKGROUND

Digital transmission systems, such as Digital Subscriber Line (DSL), radio, and coaxial cable are subject to transmission errors due to noise induced into the transmission media. Some noise, such as crosstalk and radio frequency interference, is relatively constant. Other noise sources including light dimmers, power supplies, light flashers, and gas discharge (e.g., fluorescent) lighting produces impulse noise. Impulse noise produces noise of a brief duration, and is often quite severe during the brief interval. Some sources of impulse noise produce periodic impulses. Impulse noise often has a high amplitude that can overwhelm most methods to mitigate noise.

An impulse may occur during a point during the rising edge of the sinusoid and a second impulse may occur during the falling edge. This causes a complex pattern involving two different intervals. Existing techniques do not fully address the impulse noise problems associated with complex periodic behavior such as patterns involving more than one repeating time period between impulses.

BRIEF DESCRIPTION OF THE DRAWINGS

The following detailed description of non-limiting examples of embodiments makes reference to the noted drawings, in which reference numerals represent the same parts throughout the several views of the drawings, and in which.

DETAILED DESCRIPTION

Figure 1:
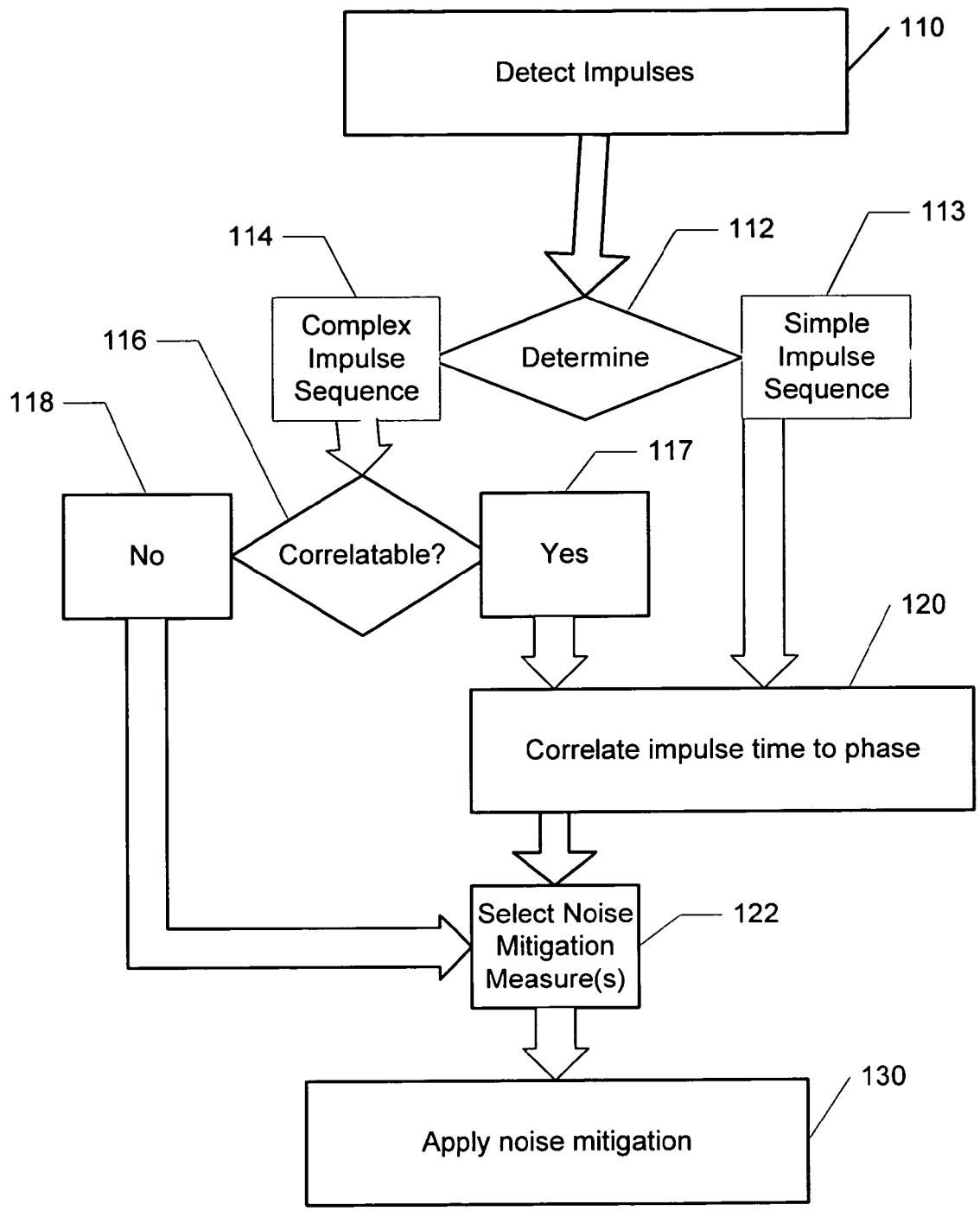
FIG. 1 is a high level process flow of a specific exemplary embodiment of a method of the present disclosure.

In view of the foregoing, the present disclosure, through description one or more various aspects, embodiments and/or specific features or sub-components, is thus intended to bring out one or more of the advantages that will be evident from the description. The terminology, examples, drawings and embodiments are illustrative and not intended to limit the scope of the disclosure.

The present disclosure addresses impulse noise mitigation that applies to many forms of digital transmission, for example DSL, radio, and coaxial cable transceivers. Digital transmission systems commonly employ three techniques to protect against noise (both constant noise and impulse noise): signal power, frequency band filtering, and error correcting codes. All of the techniques have the drawbacks of substantially reducing the payload capacity of the transmission system, and often fail to fully protect against impulse noise.

To make the signal more powerful than the noise, the transmitted signal power may be increased beyond what would be necessary if there were no impulse noise. The power technique, however, may often be ineffective due to the high amplitude of impulse noise, and can add costs to the system. Certain portions of the frequency band may be blocked by filters at the receiver in an effort to block most of the noise. The filter technique may often be ineffective due to the wideband nature of impulse noise, and frequency filtering greatly reduces the payload capacity of the system. Error correcting codes including Trellis codes, Turbo codes, parity codes, Reed-Solomon codes, and Cyclic Redundancy Check (CRC) codes may be employed in a Forward Error Control (FEC) technique or in an Automatic Repeat Request (ARQ)—such as used for the TCP-IP protocol.

Interleaving may be employed to help a FEC to address bursts of errors. Interleaving has the drawback of increasing signal latency. Interleaved FEC may be effective for addressing small bursts of errors, but impulse noise can produce error bursts of duration so long that excessive FEC redundancy may be needed to overcome the errors. Thus, Interleaved FEC may have the drawbacks of adding latency and greatly reducing payload capacity when attempting to overcome long bursts of errors.

A recent technique to mitigate periodic impulse noise tracks the recent history of the intervals between episodes of impulse noise to predict when the next episode will occur. During the predicted episodes of impulse noise, two mitigation techniques may be employed to reduce noise: (1) increase FEC redundancy during the interval, or (2) reduce the amount of payload data. Both of these mitigation techniques greatly reduce the payload capacity (in the extreme case payload becomes zero), but the capacity reduction applies only during the brief predicted noise episodes.

The technique of increasing FEC redundancy combats impulse noise by using a high redundancy FEC with powerful error correcting abilities during the predicted noise episodes while using a different FEC with much less overhead during the quiet periods.

The payload-reduction technique combats impulse noise by reducing the number of data bits sent during the predicted noise interval to increase the signal-to-noise ratio during the predicted noise interval, and also reducing the number of data bits at risk. In the extreme, the number of data bits may be reduced to zero during the predicted noise interval to provide the ultimate error reduction—at the cost of reduced payload capacity.

The prediction technique provides effective protection against periodic impulse noise with no added latency, and relatively little reduction in average payload capacity. The effectiveness of the technique generally relies on substantially accurate predictions of when future impulse intervals will occur. The technique involves the observation of the recent history of received noise impulses to determine a simple periodic interval between impulses.

The prediction technique measures the time period between past impulse noise events. It provides for the ability to track changes in the period between impulses, but the tracking is not precise. Due to practical limits on timing accuracy, and changes in the phase of the occurrences of periodic impulses, the prediction of future impulse intervals may not be exact. The technique does not necessarily directly synchronize the impulse with the power line frequency. Furthermore, the technique does not specifically address complex periodic behavior such as patterns involving more than one repeating time period between impulses.

Periodic impulse noise caused by power line related sources may occur precisely at certain points in the phase of the sinusoidal power line frequency. For example, many light dimmers turn the flow of current off and on at certain points in the sinusoidal power line frequency (60 Hz in the United States). Additionally, multiple impulse noise sources may be present that occur at different points during the phase of the power line frequency. For example, one impulse may occur during a point during the rising edge of the sinusoid and a second impulse may occur during the falling edge. The result is a complex pattern involving two different intervals.

Under the present disclosure, the time of the occurrence of an impulse noise interval is substantially correlated to the phase of the power line frequency (e.g., 60 Hz in the United States). The receiver observes the recent history of impulses noise to determine at which point in the phase of the power line frequency impulses occur. Impulses may be detected by CRC error check indications, or a sudden increase in received signal power (either wide-band power, or power in certain narrow frequency bands).

FIG. 1 is a high level process flow of a specific exemplary embodiment of a method of the present disclosure. The method of the embodiment involves detecting 110 impulses that generate impulse noise in a signal transmission medium, such as an ac power line. Noise data may be analyzed by a computer to determine 112 whether the impulses result in a simple periodic impulse sequence 113 or a complex impulse sequence 114. A complex impulse sequence 114 may be produced, for example, by two or more independently periodic impulse sequences. In the case of complex impulse sequence 114, the method may involve determining 116 whether the complex sequence maybe correlated to the phase of the ac power line frequency. Such correlation may not always be attainable due to the complexity of the impulse sequence. In the case where the complex sequence is not correlated to the phase of the power line frequency, the method involves analyzing the complex sequence, selecting 122 one or more suitable noise mitigation measures to apply with respect to the noise, and applying the selected measure or measures with respect to the noise.

Continuing with FIG. 1, the method further involves correlating 120 the time that the impulse occurs to the frequency phase of the transmission medium in the case where the impulse noise results from a relatively simple periodic impulse sequence 113 or in the case where a complex impulse sequence may nevertheless be correlated 117 to the phase of the line frequency. The method then involves selecting 122 one or more noise mitigation measures or techniques and applying the selected noise mitigation technique or techniques 130 with respect to the noise. Signal transmission errors that might otherwise arise as a result of the periodic or complex impulse noise may thus be reduced by implementing any one or more suitable noise mitigation techniques known to those skilled in the art.

Figure 2:
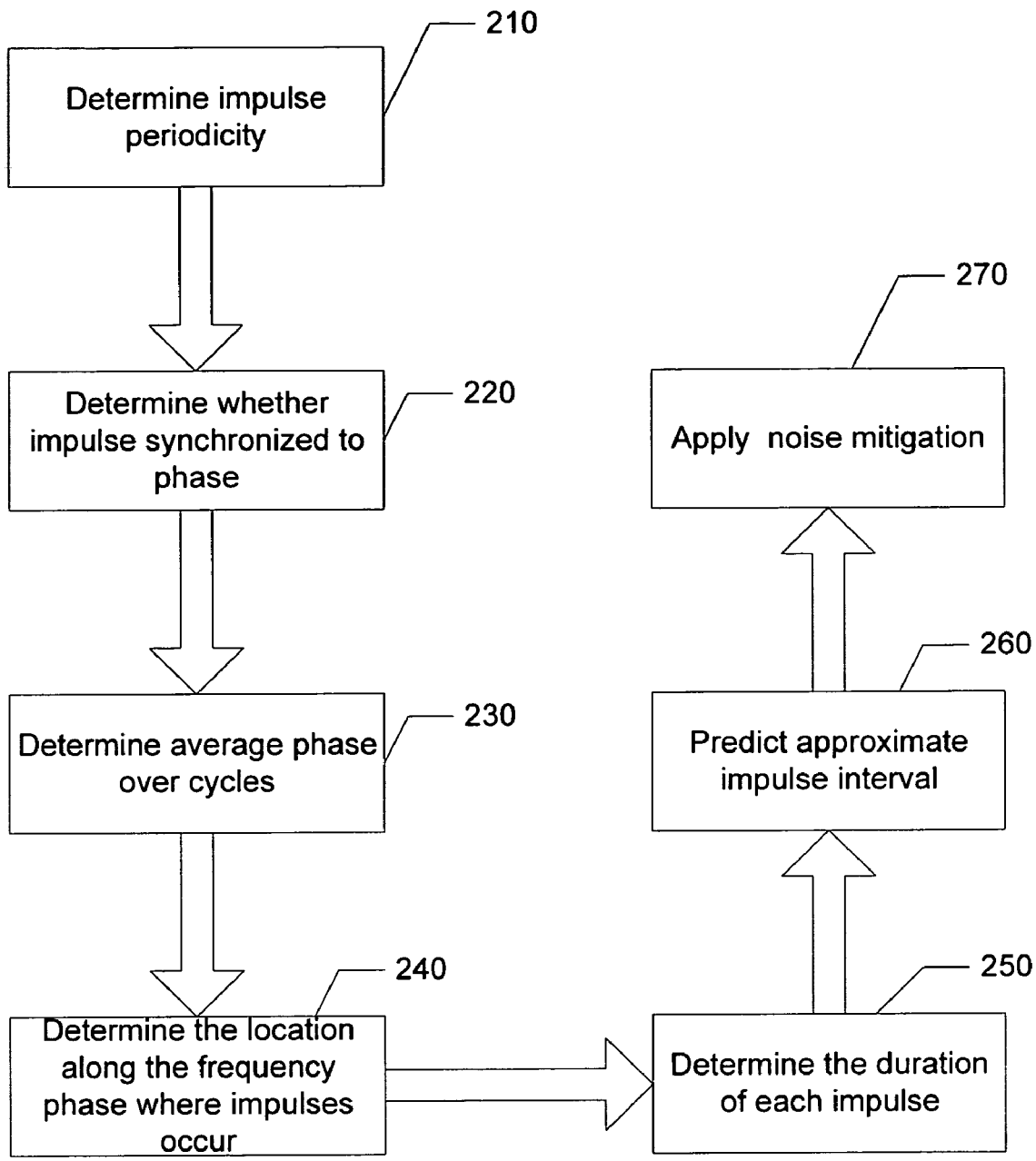
FIG. 2 is a high level process flow of a specific exemplary alternative embodiment of a method of the present disclosure.

FIG. 2 is a high level process flow of a specific exemplary alternative embodiment of a method of the present disclosure. Multiple power line cycles may be measured to: (1) determine if the noise impulses are periodic 210, (2) if the noise impulses are at least approximately synchronized with the ac power line phase 220, (3) perform averaging of the phase from several power line cycles 230, (4) determine at least approximately the point of the power line phase where the periodic impulses occur 240, and (5) determine at least the approximate duration of impulses when they occur 250. Such measurements enable the accurate, or at least approximate, prediction of future periodic noise intervals 260. Signal transmissions errors may be reduced by applying 270 any one or more of the noise mitigation techniques described herein or otherwise known to those skilled in the art.

Figure 3:
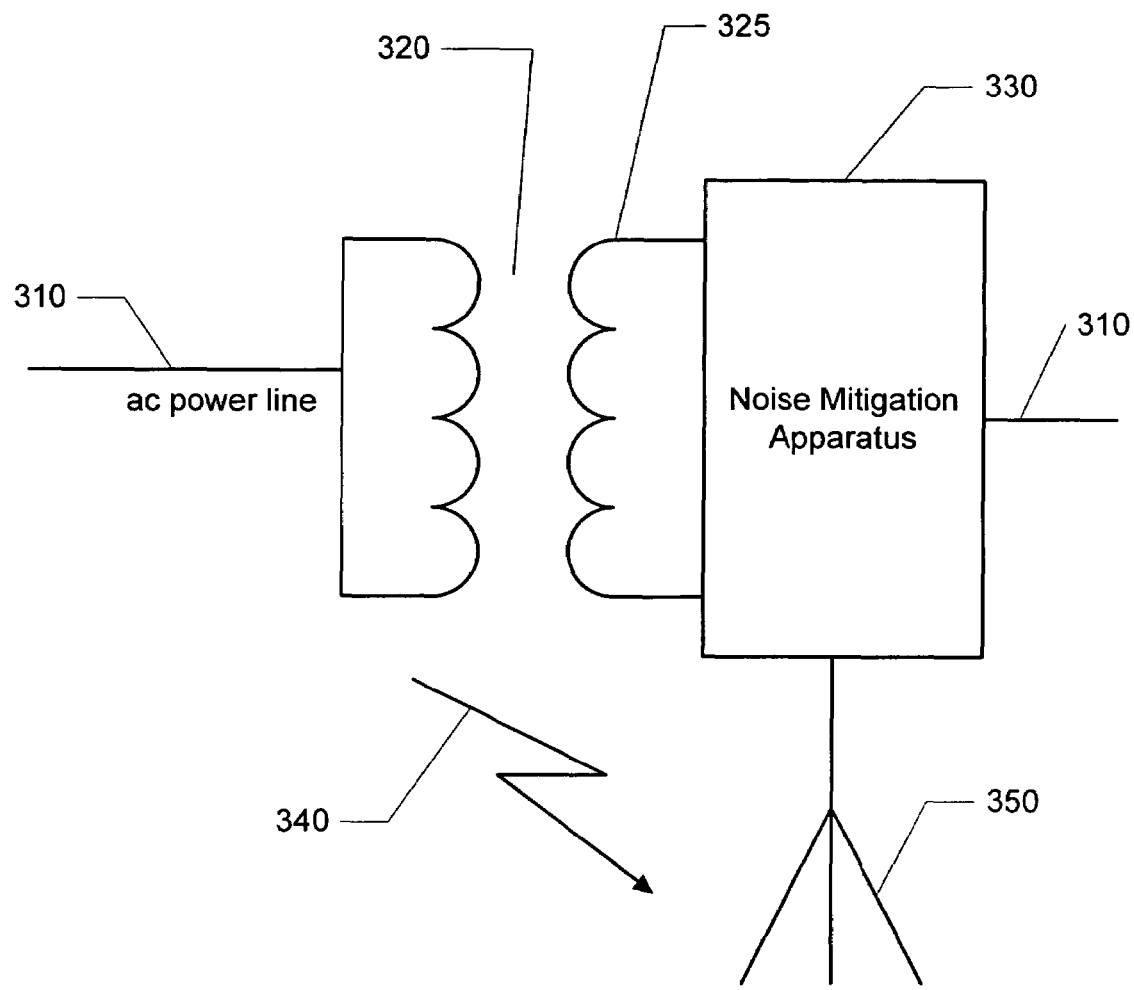
FIG. 3 is a schematic diagrammatic illustration of a specific embodiment of an impulse noise mitigation system of the present disclosure.

FIG. 3 is a schematic diagrammatic illustration of a specific exemplary embodiment of a periodic impulse noise detection system of the present disclosure. The phase of ac power line 310 may be detected by directly connecting detector apparatus 330 to secondary winding 325 of ac power line transformer 320, or alternatively measuring the 60 Hz, or in some places 50 Hz, signal induced 340 onto antenna 350. Apparatus 330 may include a detector in communication with a remote impulse noise mitigator having a computer, microprocessor chip or board that receives data from the detector, processes the data the data to select one or more noise mitigation techniques, and applies the techniques to line 310. Alternatively, apparatus 330 may include a detector and a noise mitigator integrated in apparatus 330 to operate as just described.

With respect to the data processing performed by the noise mitigator of apparatus 330, the processing may include analyzing the data to determine whether or not there is a complex impulse sequence such as may occur from two or more independently periodic impulse sequences. A complex impulse noise sequence may or may not be correlated (or correlatable) to the phase of ac power line 310 for the simple reason that the sequence is complex. Accordingly, in a case where the impulse noise is a consequence of a complex impulse sequence, apparatus 330 may select one or more noise mitigation techniques to apply to line 310 without correlating the impulses to the phase of line 310, particularly when the sequence is sufficiently complex to defeat attempts to make the correlation.

With respect to the selection by apparatus 330 of one or more noise mitigation techniques, apparatus 330 may select the use of different noise mitigation measures in distinct frequency bands. For example, for Very-High-Bit-Rate Digital Subscriber Line 2 (VDSL2), one selected measure may include the application of one selected degree of interleaving for information transmitted below 3.75 MHz and a different selected degree of interleaving for information transmitted above 3.75 MHz.

Figure 4:
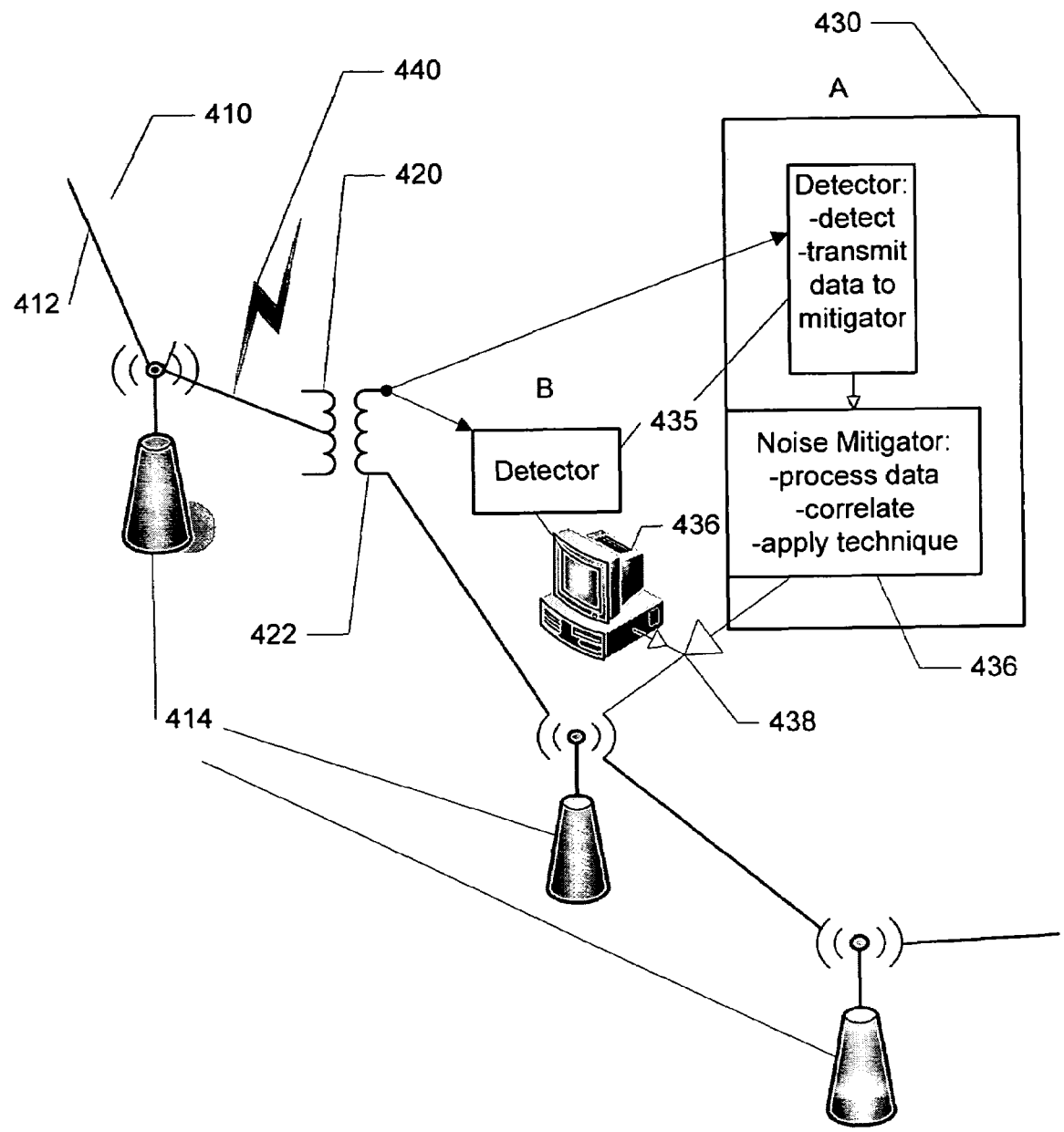
FIG. 4 is a diagrammatic representation of a specific exemplary embodiment of a signal transmission network of the present disclosure.

FIG. 4 is a diagrammatic representation of a specific exemplary embodiment of a signal transmission network of the present disclosure. Network 410 includes, but is not necessarily limited to, transmission medium 412 and a plurality of transmission nodes 414, such as for example, landline towers or poles, or cellular towers. Network 410 further includes transformer 420 having secondary winding 422. Detector or sensor 435, connected to winding 422 detects impulse 440. A computer, also referred to herein at times as a noise mitigator, 436, processes data from detector 435 to determine whether the impulse noise is periodic or complex and whether the times of occurrences of the impulses may be correlated, at least approximately, to the phase of the frequency of the transmission medium, and applies impulse noise mitigation measures 438 with respect to the impulse noise.

Computer 436 may be remotely in communication with detector 435, depicted in FIG. 4 under reference letter B or, additionally or alternatively, may be integrated with detector 435, depicted in FIG. 4 under reference letter A, in the form of, for example, a programmable microprocessor chip or board 436 having machine-readable media to process data and execute programmed instructions encoded on the media. Accordingly, detector 435 and computer 450 or processor 436, whether remote or integrated, may be referred to collectively as a noise mitigation apparatus 430 such that apparatus 430 detects noise impulses, processes information related to the impulses and applies one or more mitigation techniques such as, for example, an error correcting code with respect to the noise.

The disclosure further contemplates the detection of multiple power line synchronized impulse noise sequences at different points in the power line phase. For example, one impulse may occur each time the power line sinusoid is at X degrees phase, and a second impulse may occur each time the power line sinusoid is at Y degrees phase.

The disclosure yet further contemplates a transmission system having multiple frequency bands, where each frequency band may be separately monitored for the effects of periodic impulse noise. In the event that some bands have little or no degradation during the impulse noise intervals, then error mitigation techniques apply only to those frequency bands that exceed a pre-selected or pre-defined noise threshold.

While the disclosure addresses impulse noise that is substantially synchronized with the power line phase, the methods of the disclosure may also be combined with other noise mitigation techniques to simultaneously protect against multiple types of noise. For example, Trellis or Turbo coding may be employed at all times to protect against constant noise, while the methods described in this disclosure may be used to provide additional protection during the predicted impulse noise intervals. Also, the predictive periodic noise mitigation technique described above may be used simultaneously in combination with the methods and systems of the present disclosure to protect against periodic noise that is not synchronized to the power line frequency.

A system of the disclosure may continuously monitor the pattern of noise impulses to detect changes in the phase, the appearance of additional impulse sequences, and the cessation of some or all periodic impulse sequences. Continuous monitoring may be of particular utility for tracking changes in the impulse noise so that the predicted noise intervals are based on recent environmental behavior. During the predicted impulse noise intervals two techniques may be used to protect against transmission errors: (1) increase FEC redundancy during the interval, or (2) reduce the amount of payload data (including possibly no data during the interval).

The disclosure addresses the protection of digital transmission systems from errors caused by periodic impulse noise synchronous to the power line frequency. The protection is achieved without reducing payload capacity during the periods between the impulse noise episodes, and without increasing signal latency. Furthermore, the techniques of the disclosure protect against multiple simultaneous impulse noise producing phenomena.

Figure 5:
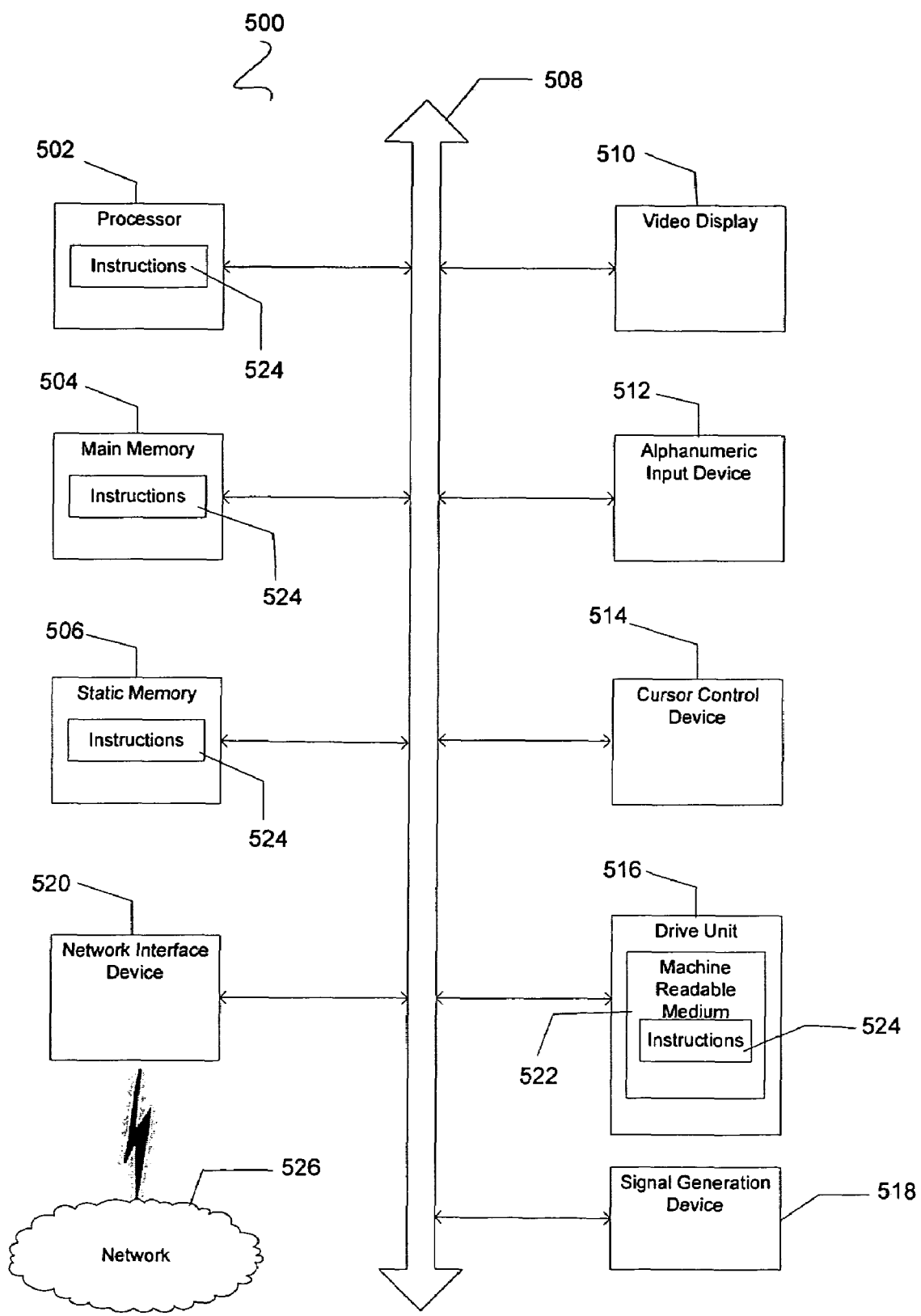
FIG. 5 is a diagrammatic representation of a machine in the form of a computer system 500 within which a set of instructions, when executed, may cause the machine to perform any one or more of the methodologies of the present disclosure.

In accordance with various embodiments of the present disclosure, the methods described herein are intended for operation as software programs running on a programmable machine such as a computer processor. FIG. 5 is a diagrammatic representation of a machine in the form of a computer system 500 within which a set of instructions, when executed, may cause the machine to perform any one or more of the methodologies discussed herein. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment. The machine may comprise a server computer, a client user computer, a digital signal processor (DSP), a microprocessor, a modem, a personal computer (PC), a tablet PC, a set-top box (STB), a Personal Digital Assistant (PDA), a cellular telephone, a mobile device, a palmtop computer, a laptop computer, a desktop computer, a personal digital assistant, a communications device, a wireless telephone, a land-line telephone, a control system, a camera, a scanner, a facsimile machine, a printer, a pager, a personal trusted device, a web appliance, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 500 may include a processor 502 (e.g., a central processing unit (CPU), a graphics processing unit (GPU), or both), a main memory 504 and a static memory 506, which communicate with each other via a bus 508. The computer system 500 may further include a video display unit 510 (e.g., a liquid crystal display (LCD), a flat panel, a solid state display, or a cathode ray tube (CRT)). The computer system 500 may include an input device 512 (e.g., a keyboard), a cursor control device 514 (e.g., a mouse), a disk drive unit 516, a signal generation device 518 (e.g., a speaker or remote control) and a network interface device 520.

The disk drive unit 516 may include a machine-readable medium 522 on which is stored one or more sets of instructions (e.g., software 524) embodying any one or more of the methodologies or functions described herein, including those methods illustrated in herein above. The instructions 524 may also reside, completely or at least partially, within the main memory 504, the static memory 506, and/or within the processor 502 during execution thereof by the computer system 500. The main memory 504 and the processor 502 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 524, or that which receives and executes instructions 524 from a propagated signal so that a device connected to a network environment 526 can send or receive voice, video or data, and to communicate over the network 526 using the instructions 524. The instructions 524 may further be transmitted or received over a network 526 via the network interface device 520.

While the machine-readable medium 522 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing or encoding a set of instructions for execution by the machine and that cause the machine to perform any one or more of the methodologies of the present disclosure. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that the software implementations of the present disclosure as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. The disclosure is considered to include a storage medium as listed herein and including art-recognized equivalents and successor media, in which the software implementations herein are stored.

Those skilled in the art will recognize that the present disclosure extends to machine-readable media ("MRM") contain instructions for execution by a programmable machine such as a computer. MRM is broadly defined to include any kind of computer memory such as floppy disks, conventional hard disks, CD-ROMs, Flash ROMS, nonvolatile ROM, RAM, Storage Media, email attachments, solid state media, magnetic media, and signals containing instructions, together with processors to execute the instructions.

The term "machine-readable medium" shall accordingly be taken to further include, but not be limited to: solid-state memories such as a memory card or other package that houses one or more read-only (non-volatile) memories, random access memories, or other re-writable (volatile) memories; magneto-optical or optical medium such as a disk or tape. Accordingly, the disclosure is considered to include any one or more of a machine-readable medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., ATM, TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "disclosure" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the claims reflect, inventive subject matter lies in less than all features of a single disclosed embodiment. Thus the following claims are hereby incorporated into the Detailed Description, with each claim standing on its own as a separate embodiment.

It is understood that the words that have been used are words of description and illustration, rather than words of limitation. Changes may be made within the purview of the appended claims, as presently stated and as amended, without departing from the scope and spirit of the disclosure in all its aspects. Although the disclosure has been described with reference to particular means, materials and embodiments, the disclosure is not intended to be limited to the particulars disclosed; rather, the disclosure extends to all functionally equivalent technologies, structures, methods and uses such as are within the scope of the appended claims.

I claim:

1. A machine-readable storage medium having instructions stored thereon that, when executed by a machine, cause the machine to:

determine whether a cable carrying a Digital Subscriber Line (DSL) signal includes complex impulse noise, wherein the complex impulse noise includes a plurality of independently periodic impulse noise components, wherein a first impulse noise component of the plurality of independently periodic impulse noise components is associated with a first noise source and occurs during a rising edge of a phase of an alternating current (AC) power line transmission at a first interval, and wherein a second impulse noise component of the plurality of independently periodic impulse noise components is associated with a second noise source and occurs during a falling edge of the phase of the AC power line transmission at a second interval that is different from the first interval;

when the cable includes the complex impulse noise, correlate a time at which the complex impulse noise occurs in the cable to at least one of the first portion of the phase and the second portion of the phase; and apply one or more noise mitigation techniques to the complex impulse noise based on the correlated time.

2. The machine-readable storage medium of claim 1, wherein the one or more noise mitigation techniques include a forward error control technique.

3. The machine-readable storage medium of claim 1, wherein the one or more noise mitigation techniques include an error correcting code.

4. The machine-readable storage medium of claim 3, wherein the error correcting code comprises a Trellis code.

5. The machine-readable storage medium of claim 3, wherein the error correcting code comprises a Turbo code.

6. The machine-readable storage medium of claim 3, wherein the error correcting code comprises a parity code.

7. The machine-readable storage medium of claim 3, wherein the error correcting code comprises a Reed-Solomon code.

8. The machine-readable storage medium of claim 3, wherein the error correcting code comprises a cyclic redundancy check code.

9. The machine-readable storage medium of claim 1, wherein the one or more noise mitigation techniques include at least one of an automatic repeat request and a cyclic redundancy check.

10. The machine-readable storage medium of claim 1, wherein the first impulse noise component repeats at the first interval, and wherein the second impulse noise component repeats at the second interval that is different from the first interval.

11. The machine-readable storage medium of claim 1, wherein the complex impulse noise is detected using a cyclic redundancy check error check technique.

12. The machine-readable storage medium of claim 1, wherein the complex impulse noise is detected based on an unscheduled increase in signal power.

13. The machine-readable storage medium of claim 1, wherein two or more periodic impulse sequences result in a complex periodic impulse noise sequence, and wherein the one or more noise mitigation techniques are performed at times that are not correlated to the phase of the AC power line transmission.

14. The machine-readable storage medium of claim 1, wherein two or more impulses occur periodically resulting in periodic impulse noise in the cable and wherein the occurrences of the periodic impulses are correlated to the phase of the AC power line transmission.

15. The machine-readable storage medium of claim 14, wherein the instructions further cause the machine to determine a period of the periodic impulse noise.

16. The machine-readable storage medium of claim 14, wherein the instructions further cause the machine to predict a time of an occurrence of the periodic impulse noise.

17. The machine-readable storage medium of claim 1, wherein at least one of the one or more noise mitigation techniques is applied continuously with respect to continuous noise in the cable.

18. The machine-readable storage medium of claim 1, wherein the cable is monitored continuously to detect impulse noise in the cable.

19. The machine-readable storage medium of claim 1, wherein the machine applies a first selected noise mitigation technique to a first set of frequency bands and applies a second selected noise mitigation technique to a second set of frequency bands.

20. A machine-readable storage medium having instructions stored thereon that, when executed by a machine, cause the machine to:

determine whether impulse noise of a cable carrying a digital subscriber line (DSL) signal is complex impulse noise that includes a plurality of independently periodic impulse noise components, wherein a first impulse noise component of the plurality of independently periodic impulse noise components is associated with a first noise source and occurs during a rising edge of a phase of an alternating current (AC) power line transmission at a first interval, and wherein a second impulse noise component of the plurality of independently periodic impulse noise components is associated with a second noise source and occurs during a falling edge of the phase of the AC power line transmission at a second interval that is different from the first interval;

determine whether the impulse noise is synchronized with a frequency of the AC power line transmission;

obtain an average of a phase of the impulse noise over a plurality of transmission cycles;

determine a point along the phase of the AC power line transmission where the impulse noise occurs;

determine a duration of each occurrence of the impulse noise;

predict an interval of time between occurrences of the impulse noise; and apply one or more noise mitigation techniques based on the predicted interval of time between occurrences of the impulse noise.

21. The machine-readable storage medium of claim 20, wherein the one or more noise mitigation techniques include a forward error control technique.

22. The machine-readable storage medium of claim 20, wherein the one or more noise mitigation techniques include an error correcting code.

23. The machine-readable storage medium of claim 22, wherein the error correcting code comprises a Trellis code.

24. The machine-readable storage medium of claim 22, wherein the error correcting code comprises a Turbo code.

25. The machine-readable storage medium of claim 22, wherein the error correcting code comprises a parity code.

26. The machine-readable storage medium of claim 22, wherein the error correcting code comprises a Reed-Solomon code.

27. The machine-readable storage medium of claim 22, wherein the error correcting code comprises a cyclic redundancy check code.

28. The machine-readable storage medium of claim 20, wherein one of the noise mitigation techniques include at least one of an Automatic Repeat Request and a cyclic redundancy check.

29. The machine-readable storage medium of claim 20, wherein at least one of the one or more noise mitigation techniques is applied continuously with respect to continuous noise in the cable.

30. The machine-readable storage medium of claim 20, wherein the cable is monitored continuously to detect impulse noise in the cable.

31. The machine-readable storage medium of claim 20, wherein the AC power line transmission is 60 Hz.

32. The machine-readable storage medium of claim 20, wherein the impulse noise is detected using a cyclic redundancy check error check technique.

33. The machine-readable storage medium of claim 20, wherein the impulse noise is detected based on an unscheduled increase in signal power.

34. The machine-readable storage medium of claim 20, wherein the machine applies a first selected noise mitigation technique to a first set of frequency bands and applies a second selected noise mitigation technique to a second set of frequency bands.

35. A computer implemented method comprising:
   determining whether impulse noise of a cable carrying a digital subscriber line (DSL) signal is complex impulse noise, wherein the complex impulse noise includes a plurality of independently periodic impulse noise components;
   determining whether the complex impulse noise is synchronized with a phase of an alternating current (AC) power line transmission;
   obtaining an average of a phase of the complex impulse noise based on analyzing a plurality of transmission cycles;
   identifying a first impulse noise component of the plurality of independently periodic impulse noise components as occurring during a rising edge of a phase of the AC power line transmission, the first impulse noise component associated with a first noise source;
   identifying a second impulse noise component of the plurality of independently periodic impulse noise components as occurring during a falling edge of the phase of the AC power line transmission, the second impulse noise component associated with a second noise source;
   determining a duration of the first impulse noise component and of the second impulse noise component;
   predicting time intervals between occurrences of the first impulse noise component and of the second impulse noise component; and
   applying one or more noise mitigation techniques based on the predicted time intervals.

36. A noise mitigation apparatus, the apparatus comprising:
   at least one impulse noise detector to detect impulse noise; and
   a noise mitigator in communication with the at least one impulse noise detector to:
      process data from the at least one impulse noise detector;
      determine whether the impulse noise of a cable carrying a digital subscriber line (DSL) signal includes complex impulse noise, wherein the complex impulse noise includes a plurality of independently periodic impulse noise components, wherein a first impulse noise component of the plurality of independently periodic impulse noise components is associated with a first noise source and occurs during a rising edge of a phase of an alternating current (AC) power line transmission at a first interval, and wherein a second impulse noise component of the plurality of independently periodic impulse noise components is associated with a second noise source and occurs during a falling edge of the phase of the AC power line transmission at a second interval that is different from the first interval;
      correlate a time at which impulse noise occurs in the cable to the first portion of the phase and to the second portion of the phase, when the impulse noise includes the complex impulse noise; and
      apply one or more noise mitigation techniques to the impulse noise.

37. The apparatus of claim 36, wherein the noise mitigator estimates a time of an occurrence of the first impulse noise component and the second impulse noise component, wherein the first impulse noise component repeats at the first interval, and wherein the second impulse noise component repeats at the second interval that is different from the first interval.

* * * * *